Figure 1:
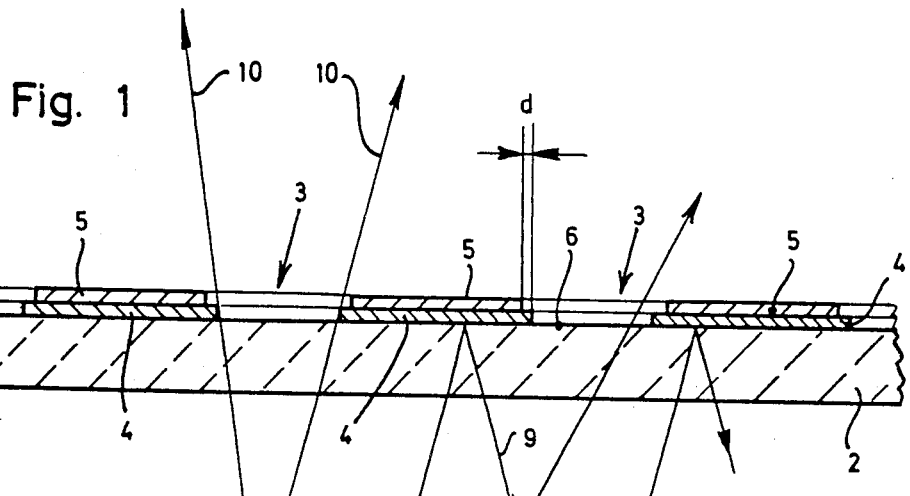

United States Patent
Detiker

[15] 3,694,945
[45] Oct. 3, 1972

[54] OPTICAL ELEMENT FOR ILLUMINATION

[72] Inventor: Jakob Detiker, Nuglar, Switzerland
[22] Filed: Nov. 5, 1970
[21] Appl. No.: 87,282

[52] U.S. Cl.............40/133 R, 161/4, 161/6, 161/408, 161/410, 240/2 AD, 240/10 R, 240/4.2, 350/101, 350/172
[51] Int. Cl.............G09f 9/38, B44f 1/00, F21p 5/00
[58] Field of Search..40/130 F, 133 R; 350/172, 101; 161/1, 3, 3.5, 4, 6, 408–410; 240/4.2, 10 R, 46.59, 2 AD, 41.3

[56] References Cited

UNITED STATES PATENTS

| | | | |
|---|---|---|---|
| 2,297,851 | 10/1942 | Wyss | 240/2 AD |
| 3,488,489 | 1/1970 | Jones | 240/46.59 X |
| 3,597,606 | 8/1971 | Abendroth | 240/41.3 |
| 3,611,603 | 10/1971 | Gesner | 240/10 R |
| 2,660,927 | 12/1953 | Burton | 161/3.5 X |
| 3,558,408 | 1/1971 | Hamilton et al. | 161/3 |
| 3,305,422 | 2/1967 | Hamilton | 161/3 X |
| 1,381,022 | 6/1921 | Schulze | 161/3.5 |
| 1,533,374 | 4/1925 | Brixey | 161/3.5 |
| 1,737,290 | 11/1929 | Anderson | 40/130 F |
| 2,043,292 | 6/1936 | Hillman | 350/172 |
| 2,267,948 | 12/1941 | Rantsch | 350/172 X |
| 3,163,554 | 12/1964 | Gessler | 40/130 F |
| 3,453,037 | 7/1969 | Osborne | 161/3 X |
| 3,463,575 | 8/1969 | Gates | 350/172 |

*Primary Examiner*—Harold Ansher
*Attorney*—Curtis, Morris & Safford

[57] ABSTRACT

The invention provides an optical structural unit for use in lighting, decorating, signalling, advertising and similar purposes which in use incorporates a light source and which can provide differing light effects in the dark when illuminated and in daylight when the light source is not in use. The element consists of a plane or curved plate of a partly transparent material e.g. a plastics material rendered turbid to reduce its transparency. This plate has either on its surface or in its interior a grating or grid of opaque material. At least the surface of the grid which faces the light source is rendered reflecting and the interstices of the grating or grid are such that part of the surface of the plate is exposed to permit light to pass through from the light source, there being at least 10 exposed areas per cm² of the plate. The grating or grid may be made of at least two superimposed layers, a lower one which is opaque and an upper one of any desired color. Preferably the lower layer of the grating extends on all sides beyond the colored layer above it.

15 Claims, 4 Drawing Figures

PATENTED OCT 3 1972  3,694,945

OPTICAL ELEMENT FOR ILLUMINATION

This invention relates to an optical element for illumination, signalling and similar purposes which can be used both in daylight and with transmitted artificial light.

For signalling, advertising and other purposes, there are many cases where it is necessary to have a lighted body which provides a strong brightness contrast to its surroundings in the dark, i.e. when a source of artificial light is switched on, but the outer surface of which has a selected color in daylight, i.e. when the source of light is switched off.

Thus, for example, the regulations governing airport signals stipulate that no colored light signals may be used at night, whilst a white signal would not provide sufficient contrast against a light cloudy sky by day. For this special purpose, it would therefore be necessary to have a signal which would provide a more or less white brightness at night but which in daylight would be of a color which contrasts against the sky.

Similar problems also arise in the case of road traffic signals. Here again, it is necessary to have signals which provide a strong contrast against their surroundings both by day and by night, i.e. both with and without artificial light, and which can be clearly identified from a distance.

The present invention provides an optical element which satisfies these requirements. The optical elements according to the invention are made of a material which is partly translucent, e.g. silicate glass or an organic glass such as acrylic glass, glass fiber reinforced polyesters, polystyrenes or a polycarbonate. The invention is characterized in that the element, which is in the form of a plane or curved plate, has a grating which is opaque and which reflects light at least on the side facing the source of light and which leaves part of the surface of the plate exposed in the form of separate individual areas, the surface having at least ten such areas per square centimeter. This grating preferably consists of at least two different layers superimposed on one another, the layer directly in contact with the surface of the element consisting of an opaque, more or less reflective material whilst the layer of grating facing the observer consists of any colored covering material.

The plate which is provided with a grating is advantageously made of a material which has been rendered turbid to reduce its light transmissiveness. As will be explained more fully hereinafter, it is advisable, when using a two-layered or multi-layered grating, to have the opaque grating which is directly applied to the plate extend beyond the edge of the colored grating above it on all sides. The width of this projecting marginal zone of the lower layer may be 0.2 to 0.5 mm, for example.

The grating which is directly applied to the plate may be made of various materials. For example, it may be applied in the form of a lacquer which contains metal, e.g. an acrylic resin lacquer into which aluminum powder has been introduced. On the other hand, this lower grating may be made of a metal, e.g. silver which has been applied by evaporation under vacuum.

The grating which faces the observer may be made of any colored lacquer and it need not be uniform in color but may, for example, have the appearance of grained colored wood. Optical elements of the last mentioned type are especially suitable for use as decorative interior light fittings. When the light behind such an element is switched on, the element appears as a uniformly brightly lit surface which in turn illuminates the room, whilst in daylight it has the appearance of a wood panelling.

In certain cases, it may be advantageous to build up the foundation grating from three different layers in order to make it very dense. In this case, the layer which is directly applied to the surface of the plate consists of a white, reflective lacquer; on this is applied a grating of black lacquer of the same size and this in turn is covered by a white grating.

As is well known, most dyes are altered by the action of shortwave light. It has therefore been found advantageous to coat that side of the element which faces the observer with a layer of colorless lacquer, e.g. a layer of acrylic resin, containing ultraviolet absorbent substances such as phenyl salicylate.

The multi-layered grating may be applied by various methods. It is especially advantageous to employ the method of screen printing which enables the gratings which are superimposed on each other to be registered very accurately with each other.

In certain cases, it may be economical, in spite of the greater expenditure in labor, to produce the element according to the invention in such a manner that the grating is not applied to the surface of the baseplate, which is optionally protected by a thin lacquer coating, but is situated inside the plate. In that case, the element is produced by a process which is based on the process described in German Patent specification No. 693 824. The process for producing the element according to the invention is then as follows: The double grating is first applied by means of a suitable binder to the inner wall of a box-like polymerization mould made of plate glass discs, the colored grating being applied directly to the glass plate and the opaque grating being applied to the colored grating. The mould is then filled with a monomer such as methylmethacrylate or styrene to which substances have been added to render it turbid, and the monomer is then polymerized in known manner. This substance which is to be hardened by polymerization may advantageously be partly polymerized to a somewhat syrupy consistency before it is introduced into the mould. The disc removed from the glass mould after polymerization is completed contains the double grating within itself and is protected against weathering, especially if the polymerization starting material had ultraviolet absorbent substances dissolved in it.

Two embodiments of the invention are illustrated by way of example in the accompanying drawing.

Figure 2:
Figure 3:
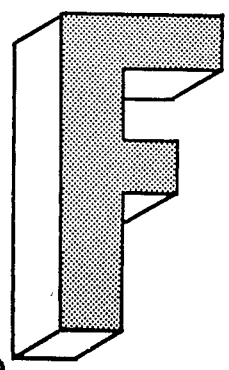
Figure 4:
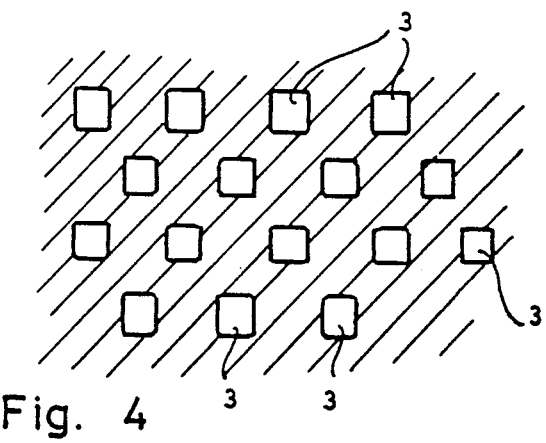

FIG. 1 is a simplified cross-section through an optical element for a light fitting which may be used in advertising, FIG. 2 shows another embodiment, FIG. 3 is a view in perspective of a light fitting which may be used for advertising, and FIG. 4 is a view from the top of part of the light fitting shown in FIG. 1.

The light fitting shown in FIG. 1 has a housing, generally indicated by the reference numeral 1, which may be in the form of a letter (see FIG. 3). On the front of this housing, facing the observer, there is arranged an element 2 according to the invention which consists of a material which transmits light but has been slightly frosted. Either glass or some suitable synthetic resin may be used as the material for this plate. A white, frosted translucent plate of acrylic glass has been found very suitable for this purpose.

As shown in FIG. 4, a grating which leaves a large number of practically square areas 3 exposed is arranged on the outer surface of the plate 2. Between the areas 3, the plate 2 is covered with at least two different superimposed layers 4 and 5. The lower layer 4 is made of an opaque, reflective material while the layer 5 above it may be made of any colored covering material.

According to a preferred embodiment of the invention, a colorless acrylic lacquer 6 is first applied to the outer surface of the plate 2, and on this is then applied an acrylic lacquer which contains aluminum powder, the particles of aluminum powder being embedded in the colorless acrylic lacquer so that they are protected against oxidation. Layer 5 may also consist of acrylic lacquer and has the required color tone. This layer may then be covered with an additional layer of transparent acrylic lacquer to serve as protection against weathering. This protective layer advantageously contains a ultraviolet absorbent substance.

A source of light 7, for example a fluorescent strip lamp, is arranged inside the housing 1.

If the light fitting described above is viewed in daylight, the appearance of the colored covering material 5 predominates due to daylight impinging on its front surface, and the front of the fitting appears as a uniformly colored surface. This impression is obtained even at a distance of only a few meters.

At night, i.e. when the source of light 7 is switched on, the rays from the source of light pass through the areas 3 to reach the eye of the observer. Due to the manifold intersections and superimpositions of the light rays, the opaque, coated parts of the surface of the plate 2 withdraw into the background and the plate appears as a uniformly brightly lit surface. It is very important for the purpose of achieving the intended effect that the foundation layer 4 should be made of a material which is completely opaque to light because otherwise rays of light pass to the outside through the colored layer 5, in which case the color would become visible to the observer. It is also important that that surface of the layer 4 which faces the plate 2 should be a good optical reflector so that the rays of light meeting this surface are reflected from it and then reflected back by the mirrored rear surface 8 of the housing 1. Rays of light, for example the ray of light indicated by the reference numeral 9, are quite liable to be reflected several times inside the housing before they pass out through one of the areas 3, but the arrangement described invariably ensures that a major portion of the light from the source of light 7 can pass out through the areas 3, thereby ensuring the desired effect of a uniformly brightly lit surface.

If i.e. covering layer 5 made of colored covering material were everywhere the same size as the foundation layer 4, numerous rays of light in the marginal region of the areas 3 would, although not penetrating the foundation layer 4, penetrate the marginal zone of the covering layer 5 and produce unwanted color effects. In order to prevent this, the lower layer 4 slightly extends on all sides beyond the edge of the covering material 5 in the marginal region of the exposed areas 3, with the result that a high proportion of the rays passing out from the source of light 7 through the areas 3, for example the ray 10 in FIG. 1 do not even come into contact with the colored covering layer 5.

In a preferred example, the width d of the marginal zone of lower layer 4 extending beyond the covering material 5 is 0.2 to 0.5 mm.

Another example is shown diagrammatically in FIG. 2 in which the thickness of the applied layers has been greatly exaggerated in relation to the thickness of the plate 2. In this case, four layers are superimposed on each other on the outer surface of the translucent plate 2, namely a layer of white lacquer 11, a layer of black lacquer 12, a layer of white lacquer 13 and a colored covering layer 14. Here again the colored covering layer 14 is set back relative to edges of the other covering layers by the amount $d$, thereby safely preventing the unwanted color effects.

The light fitting shown in FIG. 3 in the form of a letter represents only one of numerous possible embodiments. FIG. 4 shows, as already mentioned above, a grating with practically square areas. Production of the optical elements according to the invention is not in fact restricted to the use of this type of grating but may be extended to the use of various shapes of grating, for example the gratings may be rhombic, circular or elliptical or have any irregular form. In certain cases, it may even be advantageous to use a line grating extending over the whole width or length of the element, in which case the proportion of the surface through which the artificial light is transmitted to the surface covered by the colored strips depends on the distance of the element from the observer. A suitable proportion of colored to translucent surface in the optical element can be determined by a few simple tests for each individual case.

Moreover, a light fitting as shown in FIG. 1 or FIG. 2 could quite well be equipped with a strip lamp which emits colored light so that the fitting appears to have one color by day, e.g. red, and a luminous blue, for example, by night.

The opaque, reflective layer 4 advantageously consists of a metallic material or a material which contains metal, e.g. an acrylic lacquer which contains aluminum powder, but an aluminum foil or silver which has been applied by evaporation or some other completely opaque and reflective material, e.g. a photographic emulsion, could also be used.

The two superimposed layers 4 and 5 in FIG. 1 could also be in the form of a single layer if a suitable material is chosen. Such a material must on the one hand be opaque and an efficient reflector of light and on the other hand be able to be produced in any required color. Such substances are known, and one suitable substance, for example, would be an acrylic lacquer containing 40 to 50 percent by volume of aluminum powder, based on the total volume of substance.

The embodiments of the invention shown here by way of example constitute only one of the possible embodiments and the scope of the invention applied for is not restricted to it. The optical elements according to the invention are capable of numerous variations, either as regards the shape and size of the gratings or as regards the color contrasts between the element viewed by daylight and the element viewed by artificial rear lighting or as regards the pictorial form of the plate seen by daylight and/or artificial light. All such embodiments are covered by the scope of the present invention provided they incorporate the feature of the grating which is composed of at least one layer.

What I claim is:

1. An optical element for use in illuminable signs, signalling devices, walls and the like which comprises, a casing including a front plate formed of a transparent material and a rear wall having a light reflective surface facing said front plate, an artificial light source contained within said casing, said front plate having first and second opposed surfaces and a grating on one of the surfaces of said front plate including a first layer of reflective material facing said rear wall and a second layer, of a colored material, superimposed on said first layer on the side thereof remote from said rear wall, said grating having at least ten small individual open areas per square centimeter exposing the first and second surfaces of said front plate.

2. The optical element according to claim 1 wherein the plate which is provided with the grating consists of a material which has been rendered turbid to reduce its transparency.

3. The optical element according to claim 1 wherein the grating is applied to the plate shaped element by screen printing.

4. The optical element according to claim 1 wherein said colored layer has the appearance of grained wood.

5. The optical element according to claim 1 wherein said first layer comprises a multilayered grating consisting of a first layer of white pigmented lacquer facing the source of light, a second layer of black pigmented lacquer on the side of said white layer remote from said light source, and a third layer of white pigmented lacquer on said black layer on the side thereof remote from said first white layer and on which said second layer of colored material is applied.

6. The optical element according to claim 1 wherein said colored layer is coated with a clear, transparent layer of colorless lacquer which contains an ultraviolet absorbent substance.

7. The optical element according to claim 1 wherein said front plate to which the grating is applied consists of a synthetic resin which has been frosted and which is selected from the group consisting of frosted acrylic glass or a polycarbonate.

8. The optical element according to claim 1 wherein the said grating is applied to that surface of the plate which in use will be remote from the source of light.

9. The optical element according to claim 1 wherein the said grating is situated in the interior of the said plate.

10. The optical element according to claim 1 wherein the first layer of said grating faces the sources of light and extends on all sides beyond the colored grating layer superimposed on it.

11. The optical element according to claim 10, wherein the width of the marginal zone of the lower layer which extends beyond the colored covering layer is from 0.2 to 0.5 mm.

12. The optical element according to claim 1 wherein the first layer of said grating faces the source of light and consists of a lacquer which contains metal.

13. The optical element according to claim 12 wherein said lacquer comprises an acrylic resin laquer containing aluminum powder.

14. The optical element according to claim 1 wherein the first layer of said grating faces the source of light and consists of a metallic material.

15. The optical element according to claim 14 wherein said metallic material comprises silver applied to said front plate by evaporation under vacuum.

* * * * *

UNITED STATES PATENT OFFICE
CERTIFICATE OF CORRECTION

Patent No. 3,694,945　　　　　Dated October 3, 1972

Inventor(s) Jakob Oetiker

It is certified that error appears in the above-identified patent and that said Letters Patent are hereby corrected as shown below:

In the heading, please correct the inventors name to read as follows: -- Jakob Oetiker --.

Signed and sealed this 24th day of April 1973.

(SEAL)
Attest:

EDWARD M. FLETCHER, JR.　　　　　ROBERT GOTTSCHALK
Attesting Officer　　　　　　　　Commissioner of Patents